United States Patent [19]

Shimokawa

[11] Patent Number: 5,517,600

[45] Date of Patent: May 14, 1996

[54] NEURO-CHIP AND NEUROCOMPUTER HAVING THE CHIP

[75] Inventor: Yoshiyuki Shimokawa, Tokyo, Japan

[73] Assignee: Kabushiki Kaisha Toshiba, Kawasaki, Japan

[21] Appl. No.: 285,767

[22] Filed: Aug. 3, 1994

Related U.S. Application Data

[63] Continuation of Ser. No. 663,169, Mar. 11, 1991, abandoned.

[30] Foreign Application Priority Data

Mar. 1, 1990 [JP] Japan ..................................... 2-49972

[51] Int. Cl.$^6$ ........................................................ G06T 1/40
[52] U.S. Cl. ........................ 395/27; 395/800; 395/200.03; 364/DIG. 1
[58] Field of Search ................................ 395/27, 800, 24, 395/21, 200.03

[56] References Cited

U.S. PATENT DOCUMENTS

| | | | |
|---|---|---|---|
| 5,050,065 | 9/1991 | Dartois et al. | 395/650 |
| 5,163,133 | 11/1992 | Morgan et al. | 395/800 |
| 5,167,008 | 11/1992 | Engeler | 395/27 |
| 5,204,938 | 4/1993 | Skapura et al. | 395/27 |

*Primary Examiner*—William M. Treat
*Attorney, Agent, or Firm*—Oblon, Spivak, McClelland, Maier & Neustadt

[57] ABSTRACT

A neuro-chip comprising a plurality of neuron operation circuits, a broadcast bus terminal for supplying data in parallel to the neuron operation circuits and receiving data in parallel therefrom, a program data bus connected to the neuron operation circuits, a program data bus terminal for supplying a common program externally input, to the neuron operation circuits through the program data bus, a ring bus connecting the neuron operation circuits, and a plurality of ring bus terminals connected to the ring bus, for transferring data among the neuron operation circuits.

14 Claims, 9 Drawing Sheets

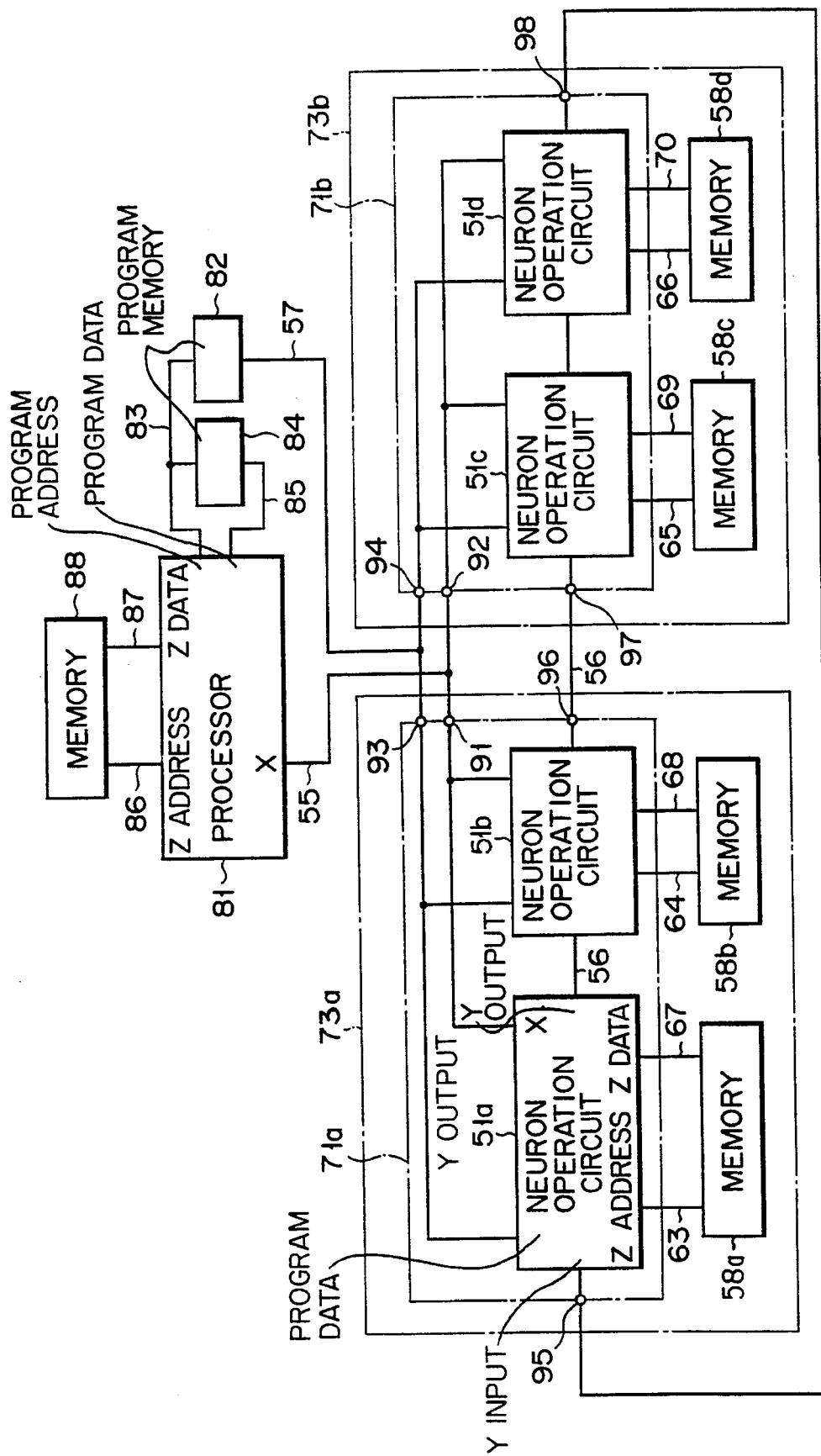
F I G. 5

$$\begin{bmatrix} I^2_1 \\ I^2_2 \\ \vdots \\ I^2_n \end{bmatrix} = \begin{bmatrix} W_{11} & W_{12} & \text{------} & W_{1m} \\ W_{21} & W_{22} & \text{------} & W_{2m} \\ \vdots & & & \vdots \\ W_{n1} & & & W_{nm} \end{bmatrix} \times \begin{bmatrix} x^1_1 \\ x^1_2 \\ \vdots \\ x^1_m \end{bmatrix}$$

F I G. 10A

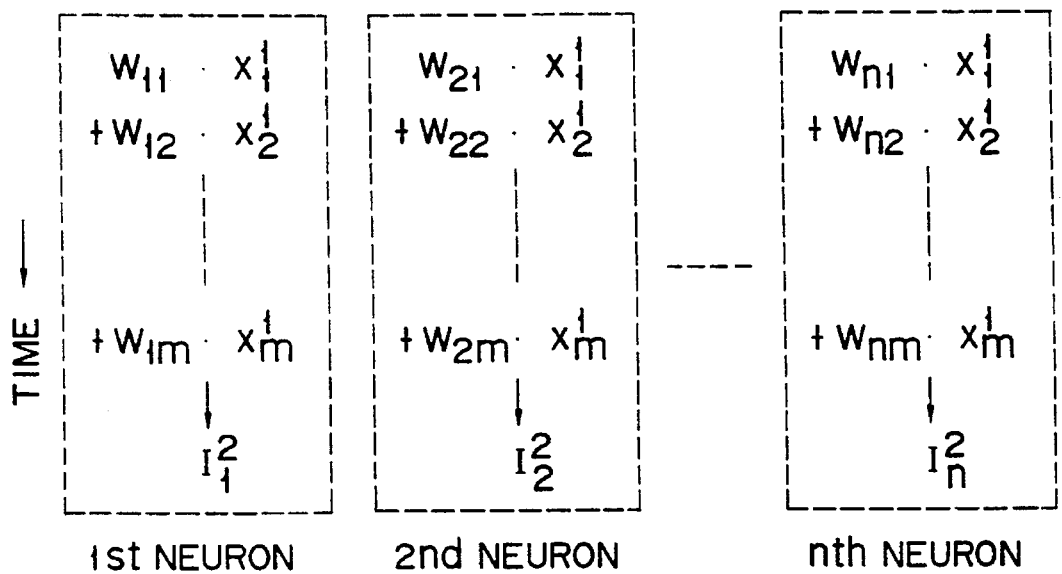

$I^2_i$: INTERIM OUTPUT OF i-TH NEURON OF THE SECOND LAYER
Wij: SYNAPTIC WEIGHT OF j-TH NEURON OF THE FIRST
LAYER AND i-TH NEURON OF THE SECOND LAYER.
$x^1_j$: OUTPUT OF j-TH NEURON OF THE FIRST LAYER

F I G. 10B

NEURO-CHIP AND NEUROCOMPUTER HAVING THE CHIP

This application is a continuation of application Ser. No. 07/663,169, filed on Mar. 1, 1991, now abandoned.

BACKGROUND OF THE INVENTION

1. Field of the Invention

The present invention relates to a neuro-chip for use in a neuro-computer or the like, and more particularly to a digital neuro-chip which helps to build an artificial neural network.

2. Description of the Related Art

Generally, neural networks are classified into two types, i.e., feedforward type represented by a multilayer perceptron model, and feedback type represented by Hopfield model.

The first type, i.e., the multilayer perceptron model will be described, with reference to FIG. 1. FIG. 1 shows how the neurons of the three layers of the multilayer perceptron model are connected. The first layer has m neurons; the second layer has n neurons, and the third layer has neurons. The mark "o" in FIG. 1 indicates each neuron.

The output of the i-th neuron of the second layer, for example, can be defined:

$$I^2 i = \sum_{j=1}^{m} W_{ij} \cdot X^1_j \quad (1)$$

$$X^2 i = f(I^2 i) \quad (2)$$

where $I^2 i$: interim output of the i-th neuron of the second layer $W_{ij}$: synaptic weight of j-th neuron of the first layer and the i-th neuron of the second layer $X^1 j$: output of the j-th neuron of the first layer $f(\ )$: a function transformation such as sigmoid function $X^2 i$: output of the i-th neuron of the second layer As can be understood from equation (1), a number of sum-of-product operations must be performed to find the interim output of each neuron. further, as is evident from equation (2), function f must be applied to the interim output, i.e., the sum of products thus obtained, in order to determine the output of the neuron of the second layer.

In the Hopfield model, too, the output of each neuron is determined in the same way as in the multi-layer perceptron model.

In recent years, various methods have been studied which may enable the neuro-chips, incorporated in a multilayer perceptrom model, to learn synaptic weights (hereinafter referred to as "weights"). The best known of these methods is backpropagation method. In this method, the neuron error made in the lowermost layer due to the output of a specified neuron is determined from the weight of all other neurons located above the specified one. Then, the weight Wij of the specified neuron is changed in accordance with the neuron error thus determined. The value $\Delta W_{ij}$, by which the weight Wij is changed, is obtained as follows:

$$\Delta W_{ij} \eta d^2 i . X^i j + \alpha . W_{ij} \quad (3)$$

The neuron error $d^2$ made in the second layer is defined as follows, if this layer is a hidden layer:

$$d^2 j = \left( \sum_{i=1}^{l} W_{ij} \cdot d^3 i \right) \cdot f'(X^2 j) \quad (4)$$

The neuron error $d^2 j$ made in the second layer is expressed as follows, if the layer is the output layer:

$$d^2 j = (y j - X^2 j) . f'(X^2 j) \quad (5)$$

In equations (4) and (5):

$d^2 j$: neuron error of j neuron in the second layer $d^3 j$: neuron error of j neuron in the third layer yj: teaching signal for neuron j $f'(\ )$: differential of $f(\ )$ η, α: coefficients A greater part of the neuron-processing time is spent to obtain the sum of products defined by equation (1) or (4). To achieve high-speed neuron processing, it is of vital importance to make the sum of products changes, whereas in equation (4), i changes. Hence, when separate operation circuits are used to perform the calculations of equation (1) and (4), cares must be taken in order to shorten the calculation time.

The neuron processing, described above, can be accomplished by one of the following alternative methods:

A. Simulation of a unit neuron by means of an analog circuit

B. Simulation of a unit neuron by means of a digital circuit

C. Solution of the above-mentioned equations by means of a computer, a microcomputer, a general-purpose DSP (digital Signal Processor), or the like FIG. 2 is a schematic representation of an analog circuit for carrying out the method A. This circuit comprises resistors 1 to 4, an operation circuit 4, and a sigmoid function generator 5. In this circuit, the resistances of resistors 1 to 4 determine the weights of neurons 1 to 4. It is therefore not easy to change the weights of the neurons.

FIG. 3 is a block diagram showing a digital circuit designed to perform the method B. The digital circuit comprises digital multipliers 6, digital address 7 and 8, and a sigmoid function generator 9, and designed to produce the output of a unit neuron. Since this is a digital circuit, it is easy to change the weights of neurons.

Obviously, analog element simulate the unit neuron shown in FIG. 2, and digital elements simulate a unit neuron illustrated in FIG. 3. Either unit neuron must be connected by signal lines to others. An enormously great number of signals lines are required to build a neural network having a large number of neurons. If this is the case, it is far from easy to alter the neuron connections. Neither the circuit of FIGS. 2 nor the circuit of FIG. 3 can be made compact by reducing the components. The less components, the lower the calculation accuracy of the neuron, and the less the learning ability thereof. Inevitably, either the neuron of FIG. 2 or the neuron of FIG. 3 occupies a relatively large area. When a great number of neurons of either type are used, forming a neural network, the network will occupy a large area. In other words, it is difficult to constitute a neural network which has a sufficiently large number of neurons and which is sufficiently compact.

The circuits shown in FIGS. 2 and 3 fail to have flexibility and learning ability which are required of them. Hence, it is the method C which has been employed in most neural network to accomplish neuron processing. Several general-purpose DSPs are used in the method C. FIG. 4 is a block diagram illustrating an apparatus having four DSPs 11 to 14. The apparatus further comprises a host computer 17, a dual port memory 18, four program memories 27 to 30, four dual port memories 31 to 34, and four data memories 35 to 38.

The host computer 17 supplies initial data and the like to the dual port memory 18 and DSP programs to the program memories 27 to 30, in response to an address signal 15 and a data signal 16. The dual port memory 18 supplies initial data (e.g., weight data) to, and receives the data from, the host computer 17. The program memories 27 to 30 stores the DSP programs supplied from the host computer 17, and supplies these programs to the DSPs 11 to 14 in response to address signals 19 to 22 and data signals 23 to 26—all supplied from the DSP 11 to 14. The dual port memories 31 to 34 and the data memories 35 to 38 are used to transfer data between any two adjacent DSPs. Each of the DSPs 11 to 14 reads a program from the associated program memory in response to an address signal and a data signal, and processes digital signals, independently of any other DSP. Each DSPs also receives data, which is required for processing the program data, from the dual port memories 18 and the associated dual port memory 31, 32, 33, or 34, designates an address signal 41, 42, 43 or 44 and a data signal 45, 46, 47 or 48, and writes data into the associated data memory 35, 36, 37 or 38.

The operation of the apparatus shown in FIG. 4 will now be explained. First, the DSPs 11 to 14 receives programs data and initial data (e.g., weight data) from the host computer 17. At the same time, part of the data from the host computer 17 is stored into the dual port memory 18. Each DSP reads the data stored in the upper dual port memory and writes it into the lower dual port memory. In other words, it supplies the data to the next DSP, as if performing baton-passing. The data items which the DSPs 11 to 14 need are stored into the data memories 35 to 38 coupled to the DSPs 11 to 14.

Then, the DSP 11 to 14 perform operations defined by equations (1) to (5). In order to use the memory capacities of the data memories 35 to 38, the same data is not stored in two or more memories. The weight data and the neuron data are divided into items, and these data items are stored into the memories 35 to 38. It will be described how the DSPs 11 to 14 perform the operation of equation (1).

As soon as the host computer 17 supplies the dual port memory 18 with the data input to the neural network, the DSP 11 reads the input data from the dual port memory 18 and supplies it to the next DSP 12 via the dual port memory 31. The DSP 12 supplies the input data to the next DSP 13 via the dual port memory 32. The DSP 13 supplies the input data to the next DSP 14 via the dual port memory 33. The DSP 14 supplies the input data to the DSP 11 via the dual port memory 34. More specifically, the DSPs 11 to 14 obtain a sum of products, i.e., an interim neuron output, in the following manner.

The DSP 11 obtains the first quarter of the interim output of a neuron, $I^2i/4$, and writes the data of $I^2i/4$ into the dual port memory 31, so that this data can be transferred to the next DSP 12. The DSP 12 obtains the second quarter of the interim neuron output, and reads the first quarter of the interim neuron output from the dual port memory 31, and writes the first and second data into the dual port memory 32, so that these data can be transferred to the next DSP 13. The DSP 13 obtains the third quarter of the interim neuron output, and reads the first and second quarters of the interim neuron output from the dual port memory 32 and writes these data of the interim neuron output into the dual port memory 33, so that these data can be transferred to the next DSP 14. The DSP 14 obtains the last quarter of the interim neuron output, and reads the first to third quarters of the interim neuron output from the dual port memory 33 and writes these data of the interim neuron output into the dual port memory 34.

Thus obtained is the interim output of one neuron. Since each layer of the multilayer perceptron model has n neurons, each DSP obtains sums of products for n/4 neurons at the same time. If m=2000, n=1000, the DSP 11 provides 250 sums of products, $I^2_1$ to $I^2_{250}$; the DSP 12 obtains 250 sums of products, $I^2_{251}$ to $I^2_{500}$; DSP 13 produces 250 sums of products, $I^2_{501}$ to $I^2_{750}$; and DSP 14 obtains 250 sums of products, $I^2_{751}$ to $I^2_{1000}$. The sums of products, I21 to $I^2_{250}$, are stored into the dual port memory 31; the sums of products, $I^2_{251}$ to $I^2_{500}$, are stored into the dual port memory 32; the sums of products, $I^2_{501}$ to $I^2_{750}$, are stored into the dual port memory 33; and the sums of products, $I^2_{751}$ to $I^2_{0000}$, are stored into the dual port memory 34. The DSP 11 processes neuron outputs $x^1_1$ to $x^1_{500}$; the DSP 12 processes neuron outputs $x^1_{501}$ to $x^1_{1000}$; the DSP 13 processes neuron outputs $x^1_{1001}$ to $x^1_{1500}$; and the DSP 14 processes neuron outputs $x^1_{1501}$ to $x^1_{2000}$. Each DSP performs operations to acquire n/4 sums of products.

Next, the DSPs 11 to 14 read the interim neuron outputs from the dual port memories 31 to 34. The DSP 11 obtains, for the second time, sums of products, $I^2_{751}$ to $I^2_{1000}$; the DSP 12 obtains sums of products, $I^2_1$ to $I^2_{250}$; DSP 13 produces 250 sums of products, $I^2_{251}$ to $I^2_{500}$; and DSP 14 obtains 250 sums of products, $I^2_{501}$ to $I^2_{750}$. At this time, too, the DSPs 11, 12, 13, and 14 process neuron outputs $x^1_1$ to $x^1_{500}$, neuron outputs $x^1_{501}$ to $x1^1_{000}$, neuron outputs $x^1_{1001}$ to $x^1_{1500}$, and neuron outputs $x^1_{1501}$ to $x^1_{2000}$, respectively. Further, the the DSPs 11 to 14 read the interim neuron outputs from the dual port memories 31 to 34, respectively, and obtain, for the third time, 250 sums of products each in a similar way. Finally, the the DSPs 11 to 14 read the interim neuron outputs from the dual port memories 31 to 34, respectively, and obtain, for the fourth time, 250 sums of products each in a similar way. As a result of this, interim neuron outputs $I^2_1$ to $I^2_{250}$, interim neuron outputs $I^2_{251}$ to $I^2_{500}$, interim neuron outputs $I^2_{501}$ to $I^2_{750}$; and interim neuron outputs $I^2_{751}$ to $I^2_{1000}$ are stored into the dual port memories 34, 31, 32, and 33, respectively.

Then, the function transform of equation (2) is performed on the interim neuron outputs thus obtained, thereby obtaining neuron output $x^1i$.

It has been pointed out, however, that the method C has the following drawbacks.

1. Since one dual port memory 18 is used to transferring data between the host computer 17 and the DSPs, thereby limiting the hardware, the input neuron data must be supplied to all DSPs via the dual port memories 31 to 33. Since data is last supplied to the DSP 14, it takes rather a long time to obtain neuron outputs. If the dual port memories have small capacity, hand-shaking of data transfer must be performed, which further increases the time required for acquiring neuron outputs. Further, since the DSPs simultaneously operate to get sums of products, any DSP cannot start operating to obtain next sum of products until the input data is transferred to all DSPs. Hence, the time required for transferring the input data causes an overhead to the neural network.

2. Although the programs for the general-purpose DSPs 11 to 14 are very similar, program memories 27 to 30 must be used for storing these programs. Consequently, lines need to be used for supplying address signals and data signals from the DSPs to the program memories, inevitably increasing the hardware. Further, each program memory must have a circuit which distinguish address signals and data signals supplied from the DSP from those supplied from the host computer 17.

3. Human brain has an enormously large number of neurons. A neural network having a comparable number of artificial neurons must have far more DSPs than four as in the apparatus of FIG. 4 to increase a processing speed. The greater the number of DSPs, the larger is the number of program memories and dual port memories which are required. Also, as has been pointed out in paragraph 1, Hence, it is practically difficult to build a large-scale neural network having a large number of DSPs. Much time is required to transfer input data.

4. Although the DSPs 11 to 14 perform almost the same operation to obtain a sum of products, they carry out different operations during transferring the input data at the same time. Hence, the DSPs need to execute different programs, and each DSP must receive and output data at the same timing as does any other DSP. Since the programs (i.e., parallel processing programs) for the DSPs 11 to 14 are different, it takes much time and labor to prepare these programs. The high cost of preparing DSP programs makes it difficult to incorporate more DSPs in the neural network.

5. It is desirable that a neural network, in particular a high-speed one, be made in the form of an LSI chip. Since the neural network of the type shown in FIG. 4 requires much hardware, it can hardly be manufactured in the form of an LSI chip. The fact that each general-purpose DSP has circuits not necessary for the neural network, for example an interruption circuit, makes it even more difficult to provide a neural-network LSI chip.

As has been described, the conventional method C has too many drawbacks to be applied to build an economical high-speed, large-scale neural network. Hence, there is a great demand for a new neuro-chip of the type which helps to manufacture a high-speed, large-scale neural network at sufficiently low cost.

SUMMARY OF THE INVENTION

The first object of the present invention is to provide a neuro-chip of simple structure, which has a plurality of neurons.

The second object of the invention is to provide a neuro-chip which can be connected to other neuro-chips.

The third object of this invention is to provide a neuro-chip which can process data at high speed.

According to a first aspect of the invention, there is provided a neuro-chip which comprises: a plurality of neuron operation circuits; a broadcast bus terminal for supplying data in parallel to the neuron operation circuits and receiving data in parallel therefrom; a program data bus connected to the neuron operation circuits; a program data bus terminal for supplying a common program externally input, to the neuron operation circuits through the program data bus; a ring bus connecting the neuron operation circuits; and a plurality of ring bus terminals connected to the ring bus, for transferring data among the neuron operation circuits.

According to a second aspect of this invention, there is provided a neuro-chip which comprises: a plurality of neuron operation circuits; a broadcast bus terminal for supplying data in parallel to the neuron operation circuits and receiving data in parallel therefrom; a program data bus connected to the neuron operation circuits; a program data bus terminal for supplying a common program externally input, to the neuron operation circuits through the program data bus; a ring bus connecting the neuron operation circuits; and a plurality of ring bus terminals connected to the ring bus, for transferring data among the neuron operation circuits. Each of the neuron operation circuits includes program hold/interpret means for holding and interpreting the common program, a broadcast bus interface connected to the broadcast bus, a ring bus interface connected to the ring bus, a weight memory for storing data representing a weight assigned to the neuron operation circuit, a memory interface connected to the weight memory, operation means for executing an instruction output by the program hold/interpret means, and means for temporarily holding data output by the operation means.

According to a third aspect of the present invention, there is provided a neuro-chip which comprises: a plurality of neuron operation circuits; a broadcast bus terminal for supplying data in parallel to the neuron operation circuits and receiving data in parallel therefrom; a program data bus connected to the neuron operation circuits; a program data bus terminal for supplying a common program externally input, to the neuron operation circuits through the program data bus; a ring bus connecting the neuron operation circuits; a plurality of ring bus terminals connected to the ring bus, for transferring data among the neuron operation circuits; and a weight memory for storing data representing a weight assigned to the neuron operation circuit. Each of the neuron operation circuits includes program hold/interpret means for holding and interpreting the common program, a broadcast bus interface connected to the broadcast bus, a ring bus interface coupled to the ring bus, a memory interface connected to the weight memory, operation means for executing an instruction output by the program hold/interpret means, and means for temporarily holding data output by the operation means.

Each neuron operation circuit can further include a control circuit having a flag which renders disables the circuit to execute the common program, in accordance with a status signal.

Alternatively, it can include a control circuit which has a plurality of counter means for starting and stopping the execution of the instruction, in accordance with the coupling relation between the neuron operation circuits.

According to a fourth aspect of this invention, there is provided a neurocomputer which comprises: a processor for controlling all components of the neurocomputer; a memory provided for the processor; a program memory provided for the processor; a plurality of neuron operation circuits; a program memory provided in common for the neuron operation circuits; a plurality of memories provided for the neuron operation circuits, respectively; a broadcast bus connecting the processor to the neuron operation circuits, for transferring data between the processor, on the one hand, and the neuron operation circuits, on the other; a ring bus connecting the neuron operation circuits, for transferring data among the neuron operation circuits; and a program data bus for supplying a program from the program memory to the neuron operation circuits. The neuron operation circuits simulate neurons and have learning ability, and function as neurons arranged in a plurality of layers.

The neuro-chip according to the invention has a simple structure, though having a plurality of neuron operation circuits. The neuron operation circuits can be built in a single chip. Neural-network inputs and teaching signals can be supplied, in parallel, to the neuron operation circuits from one broadcast bus terminal (i.e., an external terminal) through the broadcast bus. Also, the program can be supplied, in parallel, to the neuron operation circuits from one program data bus terminal (i.e., another external terminal) through the program data bus. Therefore, there is no time lag in transferring data to each neuron operation circuit; the neuro-chip operates at high speed. Since the neuron operation circuits execute the program simultaneously, the neural network of the neuro-chip encounters no overheads.

The program hold/interpret means incorporated in each neuron operation circuit interprets the program. In accordance with the output of the program hold/interpret means, the operation means and the various interfaces, used in the neuron operation circuit, are driven and repeats operations of equations (1) to (5). Hence, the neuro-chip of the invention can process the input data at high speed, though its simple structure.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 5 is a block diagram showing a neurocomputer having neuro-chips according to the invention;

FIGS. 10A and 10B are diagrams explaining the neuron operation performed by the neuron operation circuits incorporated in each neuro-chip (FIG. 5)

DETAILED DESCRIPTION OF THE PREFERRED EMBODIMENTS

Figure 1:
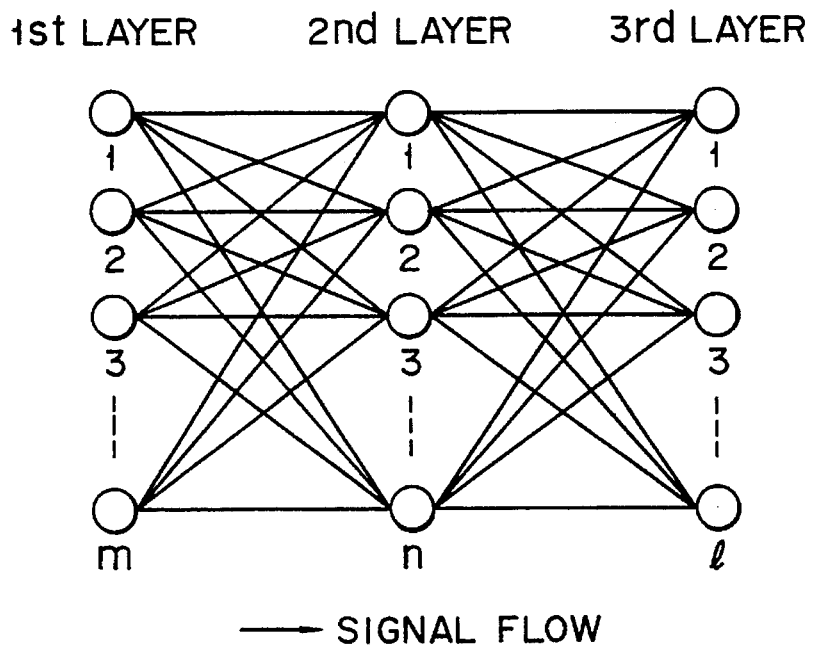
FIG. 1 is a diagram showing how artificial neurons are connected in a multilayer perceptron neural network.
Figure 2:
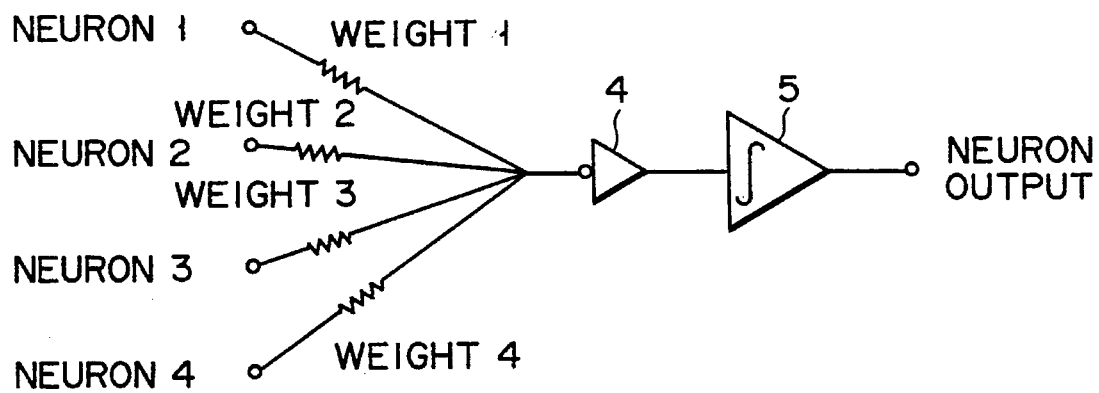
FIG. 2 is a schematic representation of an analog circuit for performing the conventional analog neuron operation.
Figure 3:
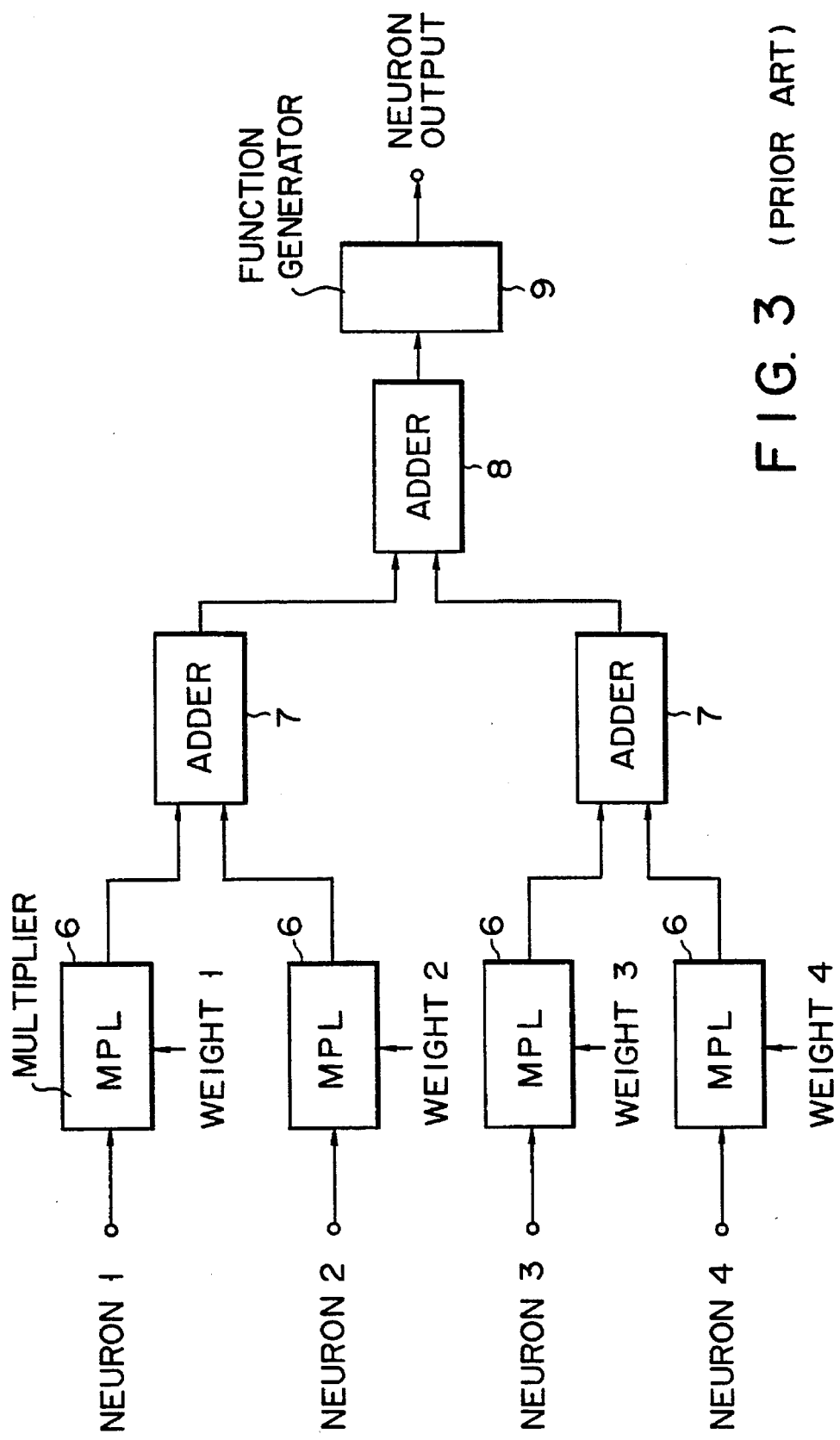
FIG. 3 is a block diagram showing a digital circuit designed to perform the conventional digital neuron operation.
Figure 4:
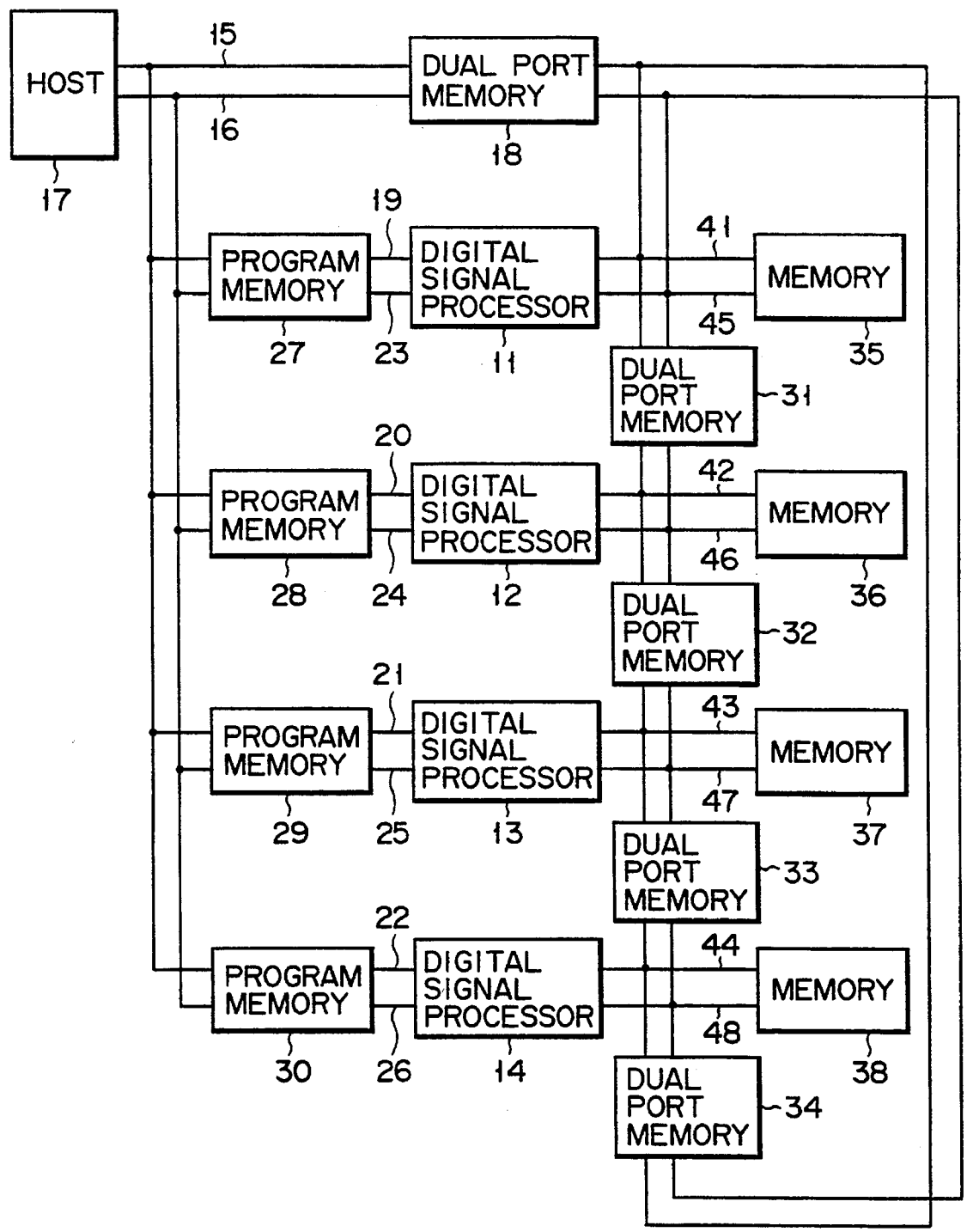
FIG. 4 is a block diagram illustrating an apparatus comprising a plurality of conventional general-purpose DSPs.

Embodiments of the neuro-chip according to this invention will now be described, with reference to FIGS. 5 to 9, FIGS. 10A and 10B, and FIGS. 11A and 11B.

FIG. 5 illustrates a neurocomputer comprising two neuro-chips 71a and 71b of the type according to the present invention. The first neuro-chip 71a comprises two neuron operation circuits 51a and 51b which form a neural network. Similarly, the second neuro-chip 71b comprises two neuron operation circuits 51c and 51d which constitute a neural network. The neuron operation circuits 51a to 51d perform the operations of equations (1) to (5), thereby simulating neurons. If there are more neurons to simulate, than the neuron operation circuits provided, each neuron operation circuit is used to simulate many neurons in time-sharing fashion. The circuits 51 to 54 are connected to a broadcast bus 55 and a ring bus 56, either bus having a multi-bit width. Further, they are connected to a program data bus 57.

The neurocomputer further comprises four memories 58a to 58d, a processor 81, program memories 82 and 84. The memories 58a to 58d are connected to the neuron operation circuits 51a to 51d, respectively, for storing different neuron weights, neuron outputs, and the like. The processor 81 is coupled to the broadcast bus 55, for determining the order in which the neuron operation circuits 51a to 51d execute the program stored in the program memory 82. More specifically, the processor 81 reads the program from the memory 82 and supplies it to the neuron operation circuits 51a to 51d through the program data bus 57. The circuits 51 to 54 execute the program at the same time. They also read the weights from the memories 58a to 58d in accordance with the address signals on address-signal lines 63 to 66 and the data signals on data-signal lines 67 to 70. Meanwhile, neuron inputs and neuron outputs are sequentially broadcast through the broadcast bus 55, and the neuron outputs generated by the circuits 51a to 51d are written into the memories 58a to 58d through the address-signal lines 63 to 66 and the data-signal lines 67 to 70.

Each of the neuron operation circuits 51a to 51d multiplies the neuron inputs supplied via the broadcast bus 55, each with the weight read from the memory 589a, 58b, 58c or 58d, thereby obtaining products, and then adds these products, thus providing a sum of products. Namely, each neuron operation circuit carries out the operation of equation (1). In other words, each neuron operation circuit multiplies value $x^i j$ stored in the broadcast bus 55 with value Wij stored in the associated memory, and add the resultant products together, thus obtaining value $I^2 i$. For instance, the memories 58a and 58d store values $W_{11}$ to W1m and values $W_{21}$ to $W_{2m}$, respectively; values $x^1 i$ to $x^1 m$ are sequentially broadcast through the broadcast bus 55; and the neuron operation circuits 51a and 51b obtain value $I^2_1$ and $I^2_2$, respectively.

The processor 81 is a so-called stored-program computer. It gives a program address to the program memory 84 through the program-address line 83, and receives the program from the memory 84 through the data-signal line 85. The processor 81 is connected to a memory 88 by an address-signal line 85 and a data-signal line 87. The memory 88 stores neuron inputs and teaching signals. The processor 81 reads the neuron inputs and the teaching signals from the memory 88 and supplies these signals to the neuron operation circuits 51a to 51d through broadcast bus 55.

The program for the processor 81 and the program for the neuron operation circuits 51a to 51d are read from the program memory 84 and the memory 82, respectively, in accordance with the program address signals read from the processor 81 onto the program-address line 83. Therefore, the processor 81 processes the data on the broadcast bus 55 in synchronization with controlling the broadcast bus 55 on the basis of the program stored in the memory 84. The data-processing and the bus-controlling are easily and reliably achieved in synchronism. Hence, the neurocomputer needs no latches, no FIFO (First-In, First-out) devices, or no dual port memories for ensuring data synchronization. Nor does it require any time for checking and correcting data synchronization.

As has been described, the neuron operation circuits are connected by means of the ring bus 56 having a multi-bit width, so that data is transferred, or circulated, among them. The ring bus 56 is used to shift the operation results from one neuron operation circuit to the preceding one, thereby performing the backpropagation defined by equation (4) in the case where no weight is stored in the memory associated with the neuron operation circuit and data is distributed to the memories associated with the other neuron operation circuits. By virtue of the ring bus 56, the data can be shifted from each neuron operation circuit to the next one, exactly at the same time the data is shifted from any other neuron operation circuit to the next one. This is because the neural operation circuits 51 to 54 request the same data at the same time.

As is evident from FIG. 5, the neuro-chip 71a comprises the neuron operation circuits 51a to 51b, while the neuro-chip 71b comprises the neuron operation circuits 51c and 51d. Nevertheless, the chip 71a can comprise the circuits 51a to 51b and the memories 58a and 58b, and the chip 71b can comprise the circuits 58c and 58d and the memories 58c and 58d.

The neuro-chips 71a and 71b will now be described, in greater detail. The neuron operation circuits 51a to 51b contained in the neuro-chip 71a, and the neuron operation circuits 51c and 51d contained in the neuro-chip 71b are connected by the broadcast bus 55 and the program data bus 57, both common to all neuron operation circuits. Hence, it suffices to use only two external terminals 91 and 92 for connecting the bus 55 to the neuro-chips 71a and 71b, respectively, and only two external terminals 93 and 94 for connecting the program data bus 57 to the neuro-chips 71a and 71b, respectively. Also, it suffices to provide two external terminals 95 and 96 at the left and right end of the neuro-chip 71a, and two external terminals 97 and 98 at the left and right ends of the neuro-chip 71b, for connecting the ring bus 56 to the neuro-chips 71a and 71b. The number of the signals at these external terminals 91 to 98 does not depend on the number of the neuron operation circuits used. In view of this, the neurocomputer shown in FIG. 5 can easily modified into a large-scale one, merely by incorporating more neuro-chips each including more neuron operation circuits.

The number of the lines connected to the memories 58 to 61 for supplying the address signals 63 to 66 and the data signals 67 to 70 depends on the number of the neuron operation circuits used. These lines can be eliminated, merely by applying the integrated-circuit technology rapidly advanced in recent years. For example, the memories 58a and 58b can be integrally formed with the circuits 51a and 51b, thus forming a neuro-chip 73a, and the memories 58c and 58d are integrally formed with the circuits 51c and 51d, thus constituting a neuro-chip 73b. In this case, there is no increase in external terminals generally known as "pins".

Figure 6:
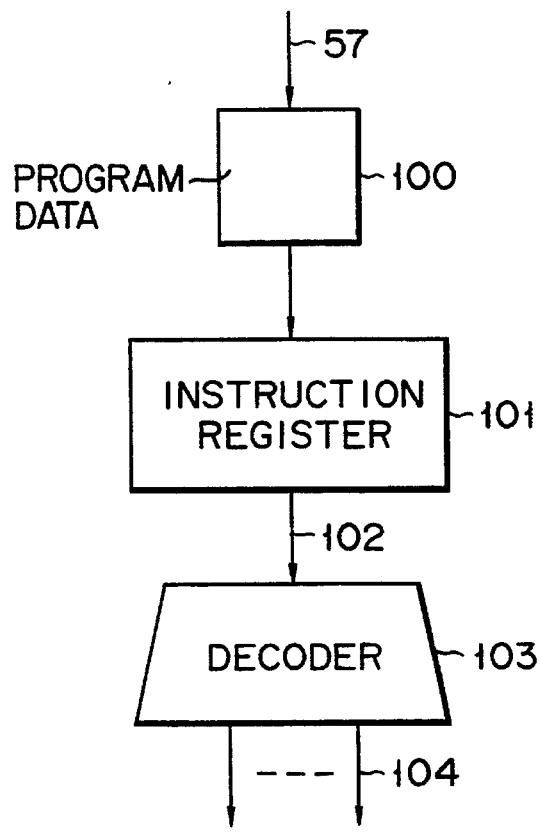
FIG. 6 is a block diagram showing a program hold/interpret means in a neuron operation circuit incorporated in each neuro-chip (FIG. 5), for interpreting the program supplied via the program data bus (FIG. 5)
Figure 7:
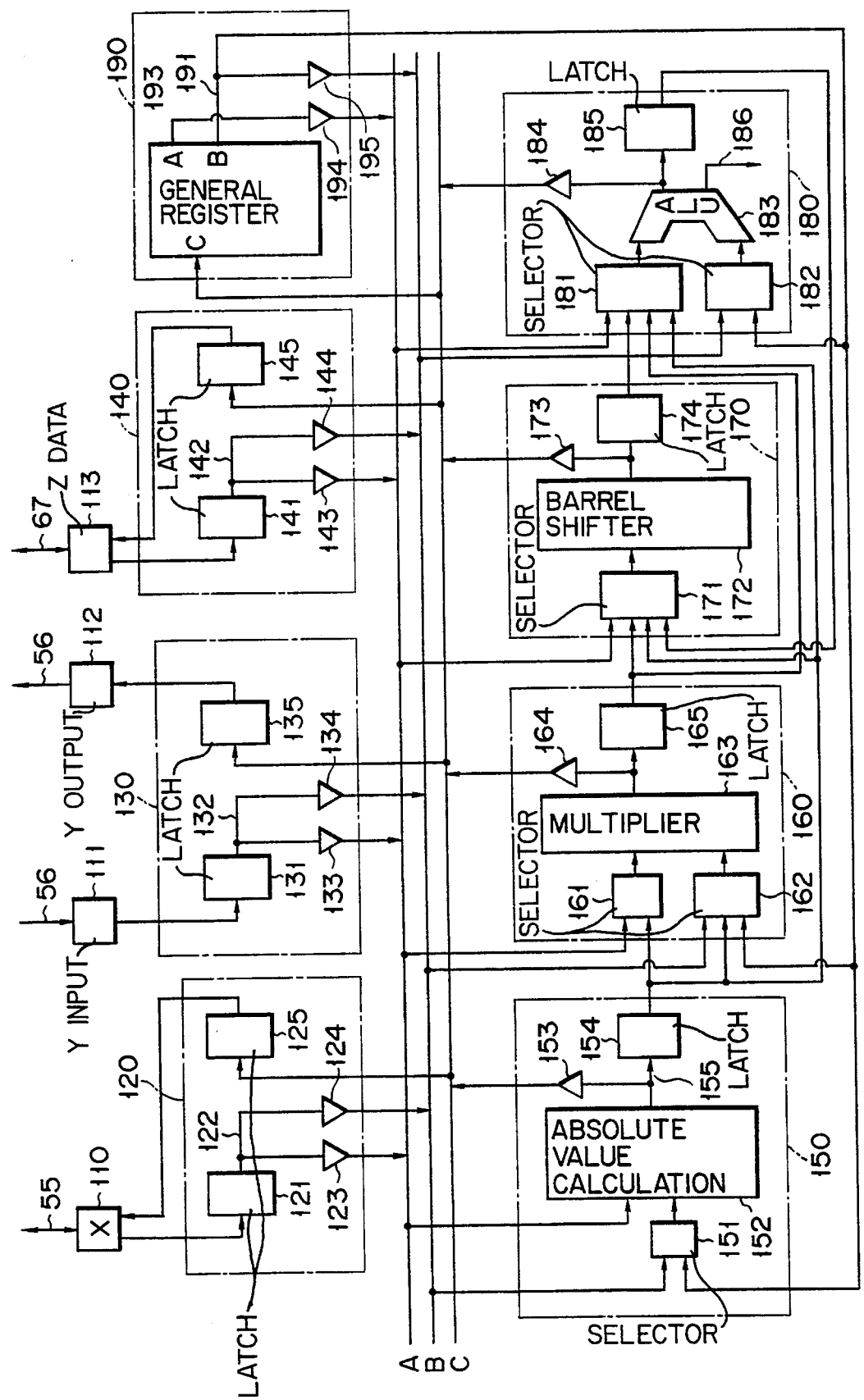
FIG. 7 is a block diagram illustrating the interfaces of the neuron operating circuit incorporated in each neuro-chip (FIG. 5), and also means used therein for executing a program.
Figure 8:
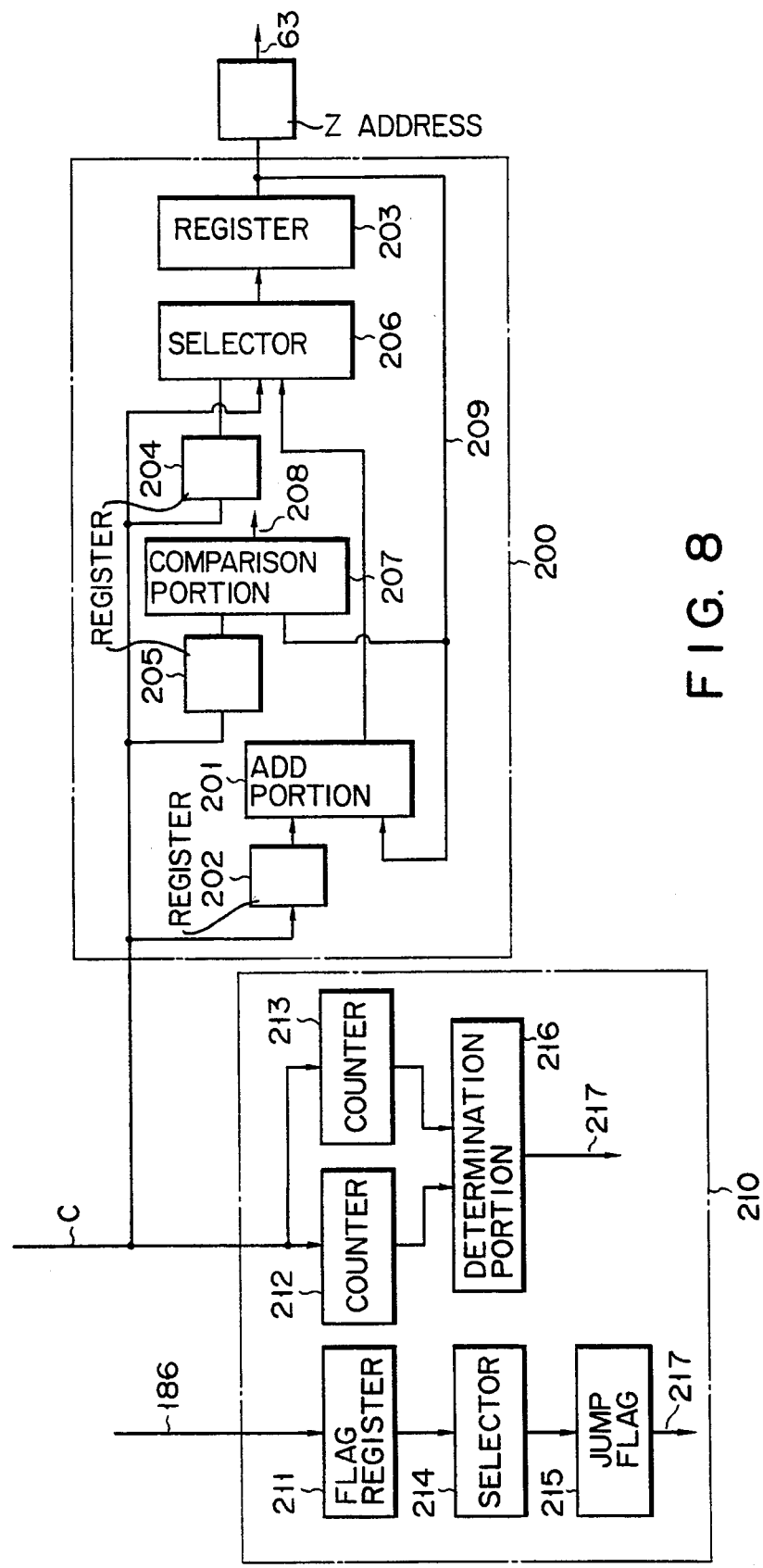
FIG. 8 is a block diagram of the control means provided in each of the neuron operation circuits incorporated in each neuro-chip (FIG. 5)

The neuron operation circuits 51a, 51b, 51c and 51d are of the same structure. Hence, only the circuit 51a and the neuro-chip 71a will be described, with reference to FIGS. 6, 7, and 8. FIG. 6 schematically shows the program hold/interpret means incorporated in the neuron operation circuit 51a. The program hold/interpret means is designed to interpret the program supplied via the program data bus 57 and control all components of the neuro-chip 71a. FIG. 7 shows the various interfaces and the program-executing means, both incorporated in the neuron operation circuit 51a. The interfaces are connected to the buses, i.e., the broadcast bus 55, the ring bus 56, the memory buses, etc. FIG. 8 shows the control means incorporated in the neuron operation circuit 51a.

As is shown in FIG. 6, the program hold/interpret means comprises an external terminal 100, an instruction register 101 connected at input to the terminal 100, and a decoder 103 connected to the output of the register 101. In operation, the program supplied from the program memory 82 to the external terminal 100 through program data bus 57 is stored into the instruction register 101. Then, the program is input to the decoder 103 through the signal line 102. The decoder 103 interprets the instruction contained in the program, and outputs signals through a signal line 104 to the other components of the neuron operation circuit 51a. The operation register, latch circuit, and memory (none shown) incorporated in the circuit 51a function in response to the signals output by the decoder 103, whereby data is written into, and read from, the operation register, the latch circuit, and the memory. It should be noted that the neuro-chip 71a has no other instruction registers and no other decoders. Actually, the instruction register 101 stores two or more consecutive instructions contained in the program, and the decoder 103 interprets a plurality of instructions. Hence, pipe-line operation is achieved in the the neuro-chip 71a.

As is illustrated in FIG. 7, the neuro-chip 71a further comprises a broadcast-bus interface 120 for receiving data from and supplying it to the broadcast bus 55; a ring-bus interface 130 for receiving data from and supplying it to the ring bus 56; a memory-data interface 140 for writing data into and reading it from the memory 58a (identical to the memories 58b, 58c and 58d). The neuro-chip 71 further comprises an absolute-value calculating circuit 150, a multiplier circuit 160, a shift circuit 170, an ALU (Arithmetic Logic Unit) circuit 180, and a general register circuit 190. These components of the neuro-chip 71a are connected by A bus, B bus, an C bus—all being are data buses.

At the broadcast-bus interface 120, the broadcast bus 55 is connected to an external terminal 110, so that data can be transferred between the bus 55 and the interface 120. As can be understood from FIG. 7, the interface 120 has two latch circuits 121 and 125 and two buffers 123 and 124. The data received at the terminal 110 from the broadcast bus 55 is latched by the latch circuit 121. The output 122 of the latch circuit 121 is supplied to the A bus and the B bus through the buffers 123 and 124, respectively. The data on the C bus is latched by the latch circuit 125 and then supplied to the broadcast bus 55 through the external terminal 110.

Since the neuron operation circuits 51a to 51d are connected to the single broadcast bus 55, the data on the bus 55 can supplied to all neuron operation circuits 51a to 51d. To supply the data to the terminal 110 only, the processor 81 supplies a chip-enable signal CE to the external terminal 110. The terminal 110 can be divided into two parts, i.e., an input terminal 111 and an output terminal 112, as those connected to the ring bus 56. If this is the case, the output magnitude can be decreased. Although the neuro-chip 71a has a plurality of neuron operation circuits, i.e., two neuron operation circuits 51a and 51b, it sufficient for the chip to have only one external terminal.

Two external terminals, i.e., an input terminal 111 and an output terminal 112, are connected to the ring-bus interface 130. As is evident from FIG. 7, the ring-bus interface 130 is of the same structure as the broadcast-bus interface 120. The data supplied from the ring bus 56 through the input terminal 111 is latched by a latch circuit 131. The output of the circuit 131 is supplied to A bus and B bus through two buffers 133 and 134. The data on the C bus is latched by a latch circuit 135 and then supplied to the ring bus 56 through the output terminal 112. Even if the neuron-chip 71a has a plurality of neuron-operation circuit, i.e., two neuron operation circuit 51a and 51b, it suffices to connect the input terminal 111 and the output terminal 112 to the neuron operation circuits 51a and 51b, respectively.

A terminal 113 is connected to the memory-data interface 140. Through this terminal 113, data is read from and written into, for example, the memory 58a. The memory-data interface 140 is of the same structure as the broadcast-bus interface 120. The data read from the memory 58a is latched by a latch circuit 141. The output of the circuit 141 is supplied to A bus and B bus through two buffers 143 and 144. The data on the C bus is latched by a latch circuit 145 and then supplied to the memory 58a through the terminal 113.

The absolute-value calculating circuit 150 is designed to find the absolute value of the difference between two inputs, and to perform addition and subtraction. The circuit 150 comprises a selector circuit 151, an absolute-value calculator 152, a buffer 153, and a latch circuit 154. The selector circuit 151 selects either the signal on the B bus or the signal output by the general register circuit 190, in accordance with an instruction supplied to it. The absolute-value calculator 152 calculates the absolute value of the difference between the signal on the A bus and the signal selected by the circuit 151, i.e., the signal on the B bus or the output signal of the register circuit 190. The output of the calculator 152 is supplied to the C bus through the buffer 153 and is also latched by the latch circuit 154. The output of the latch circuit 154 is input to the multiplier circuit 160, the shift circuit 170, and the ALU circuit 180.

The multiplier circuit 160 is designed to multiply two input signals, thereby to output a signal representing the products of the input signals. The circuit 160 comprises two selector circuits 161 and 162, a multiplier 163, a buffer 164, and a latch circuit 165. The selector circuit selects either the signal on the A bus or the output signal of the absolute-value calculating circuit 150, in accordance with an instruction which will be later described. The selector circuit 162 selects the signal on the B bus, the output signal of the circuit 150, or the output signal of the general register circuit 190, in accordance with an instruction which will be later described. The multiplier 163 multiplies the signals output by these selector circuits 161 and 162. The output signal of the multiplier 163, which represents the product of the selector outputs, is supplied to the C bus through the buffer 164 and is stored into the latch circuit 165 and ultimately input to the shift circuit 170 and the ALU circuit 180.

The shift circuit 170 is designed to achieve logic shifting of the input value, and also arithmetic shifting thereof. It comprises a selector circuit 171a, a barrel shifter 171b, a buffer 173, and a latch circuit 174. The selector circuit 171a selects the signal on the A bus, the output signal of the absolute-value calculating circuit 150, the output signal of the multiplier circuit 160, or the output signal of the ALU circuit 180. The barrel shifter 171b shifts the signal output by the selector circuit 171. The output signal of the barrel shifter 171b is supplied to the C bus via the buffer 173, and is also latched by the latch circuit 174. The signal output by the latch circuit 174 is supplied to the ALU circuit 180.

As is evident from FIG. 7, the ALU circuit 180 comprises two selector circuits 181 and 182, an ALU 183, a buffer 184, and a latch circuit 185. The selector circuit 181 selects the signal on the A bus, the output signal of the calculating circuit 150, the output signal of the multiplier circuit 160, or the output signal of the shift circuit 170. The selector circuit 182 selects either the signal on the B bus or the output signal of the general register circuit 190. The ALU 183 performs an arithmetic operation or a logic operation on the signals output by the selectors circuits 181 and 182. The buffer 184 supplies the output signal of the ALU 183 to the C bus. The latch circuit 185 latches the output signal of the ALU 183 and then input the same to the shift circuit 170. If the output of the ALU 183 overflows, it is limited to either a maximum value or a minimum value. The ALU 183 outputs a status signal 186, which is supplied to the control means illustrated in FIG. 8.

The general register circuit 190 comprises a general register 192 and two buffers 194 and 195. The general register 192 has one write terminal (C terminal) and two read terminals (A and B terminals), and can therefore function as a three-port memory. It is used for temporarily storing the data supplied from the interfaces 120, 130, and 140 and also the results of the operations performed by the circuits 150, 160, 170 and 180, or for transferring data to be processed for further calculation. The data signals read from the A and B terminals of the general register 193 are output to the A bus and the B bus through the buffers 194 and 195, respectively. The general register circuit 190 has a signal line (not shown), through which a data signal 191 is supplied directly to any other neuron operation circuit when the other neuron operation circuit occupies the B bus.

The control means, which is incorporated in the neuron operation circuit 51a, will now be described with reference to FIG. 8. The control means comprises an address generator circuit 200 and a control circuit 210.

The address generator circuit 200 is designed to generate an address and supplies it to, for example, the memory 58a. Once the internal registers have been set, the address generator circuit 200 outputs addresses sequentially, each incremented by, for example, one from the preceding address by virtue of the use of an adder circuit. More specifically, the circuit 200 comprises an adder portion 201, an increment register 202, an address register 203, an initial-value register 204, a final-value register 205, a selector 206, and a comparator portion 207. The increment register 202 stores the value by which the address register 203 is to increment an address. The adder portion 201 adds the output of the increment register 202 and the output of the address register 203 storing the address designated at present. The output of the adder portion 201 is supplied through the selector 206 to the address register 203. The comparator portion 207 compares the address stored in the final register 205 with the address stored in the address register 203. If the comparator portion 207 determines that these addresses are identical, it supplies a signal 208 to the selector 206. In response to the signal 208, the selector 206 selects the contents of the initial-value register 204. As a result of this, the initial value stored in the register 204 is written into the address register 203. Thus, the address stored in the address register 203 is incremented by a given value, from the initial value to the final value. The selector 206 selects the output on the C bus, the output of the initial-value register 204, or the output of the adder portion 201, and supplies the selected output to the address register 203.

The control circuit 210 comprises a flag register 211, counters 121 and 213, a selector 214, a jump flag 215, and determination portion 216. The circuit 210 is designed to invalidate some instructions. A status signal 186 output by the ALU circuit 183 (FIG. 7), such as carry, overflow, greater or less, is stored into the flag register 211. If the signal, which the selector 214 has selected from the signals stored in the register 211, is set in accordance with a set J instruction, this signal is supplied to the jump flag 215. The jump flag 215 is thereby set. In this case, no further operations are rendered invalid. The jump flag 215 is reset in response to a reset J instruction.

Generally, in a neural network of the Hopfield type, all neurons are connected. In some cases, most of these neurons have weight of "0," and it is not necessary to use memories in the same number as the neurons. This is why the control circuit 210 has counters 212 and 213, for controlling the time of staring the execution of an instruction and the time of stopping the execution thereof. Then, the outputs of only those neurons which are connected are obtained by executing the calculation. In order to solve a traveling solesman problem, wherein the soles man is visiting 100 cities 10,000 neurons (=100×100) are needed. In this case, it should be noted that almost weights are zero. We assume that a neural network is constructed by arranging neurons in 100×100 plane. The weights are not zero only for 100 neurons in one specific row. In almost rows, the weight of a few neuron is not zero. Therefore, the operation is executed every 100 neurons in one row. Hence, the counters 212 and 213 are set upon completion of every 100 operations and the calculation is executed within a designated region. More precisely, the counter 212, 213 are used to determine the time of staring the execution of an instruction and the time of stopping the execution thereof. Thus, the instruction is executed during a period between these points of time. The counters 212 and 213 are set by the signal on the C bus. The outputs of the counters 212 and 213 are input to the determination portion 216, which generates an output signal 217. This signal 217 is supplied to the circuit shown in FIG. 7, controlling some of the components thereof.

Figure 9:
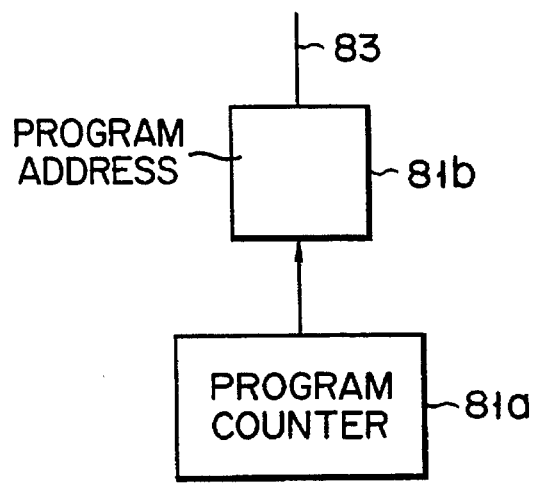
FIG. 9 is a block diagram showing a circuit which is added to each neuro-chip (FIG. 5), so that the neuro-chip can function as a processor.

The processor 81 is basically a stored program computer, just like neuron operating circuits 51 to 54 shown in FIG. 5. More precisely, the processor 81 is constituted by adding a program counter 81a and a PAD terminal 81b to the neuron operating circuits 51, is illustrated in FIG. 9. In other words, the neuro-chip can function as a processor, if a program counter and a PAD terminal are added to it.

The operation of the neurocomputer shown in FIG. 5 will now be explained.

1. Neuron Operation

Neuron operation is defined by equation (1). FIG. 10A shows the matrix of all neurons of the second layer. With reference to FIG. 10B, it will be explained how the neuron operation circuits 51a to 51d calculate the interim outputs of the second-layer neurons.

First to determine the interim output $I^2_1$ of the first neuron the neuron operation circuit 51a multiplies the weights of the first row, i.e. $W_{11}$ to $W_{1m}$, by the outputs of the first-layer neurons i.e. $X^1_1$ to $X^1_m$, respectively. Further the circuit 51a adds the products of these multiplications i.e., $W_{11}X^1_1$, $W_{12}X^1_2, \ldots, W_{1m}X^1_m$. As a result the sum of products is obtained which is $I^2_1$, i.e. the interim output of the first neuron of the second layer. The weights of the first row, $W_{11}$ to $W_{1m}$ are stored in the memory 58a connected to the neuron operation circuit 51a.

Next to determine the interim output $I^2_2$ of the second neuron the neuron operation circuit 51b multiplies the weights of the second row, i.e. $W_{21}$ to $W_{2m}$, by the outputs of the first-layer neurons i.e. $X^1_1$ to $X^1_m$, respectively. Then the circuit 51b adds the products of these multiplications i.e. $W_{21}X^1_1$, $W_{22}X^1_2, \ldots, W_{2m}X^1_m$. As a result, the sum of products which is $I^2_2$, i.e., the interim output of the second neuron of the second layer. The weights of the second row, $W^2_1$ to $W^2_m$ are stored in the memory 58b coupled to the neuron operation circuit 51b.

In the same way, the neuron operation circuit 51c obtains the interim outputs of the third neuron of the second layer, i.e., $I^2_3$, by multiplying the weights stored in the memory 58c by the outputs of the first-layer neurons, and then by adding the resultant products, and the neuron operation circuit 51d obtains the interim outputs of the fourth neuron of the second layer, i.e., $I^2_4$, by multiplying the weights stored in the memory 61 by the outputs of the first-layer neurons, and then by adding the resultant products.

Hence, as the outputs of the first-layer neurons, $X^1_i$ (i=1, 2, ..., m) are supplied to the neuron operation circuits from the processor 81 through the broadcast bus 55, the circuits obtain the sum of products, $I^2_i$ (i=1, 2, ..., n) which are the interim outputs of the second-layer neurons.

The program (i.e., instructions) is read from the program memory 82 under the control of the processor 81. The program is then supplied to the terminals 100 (i.e., the PD terminal shown in FIG. 6) of the neuron operation circuits 51a to 51d through the program bus 57. Finally, the program is held in the instruction register 101 of each neuron operation circuit. The decoder 103 interprets the program and generates an output. In accordance with this output, the interfaces 120, 130 and 140 and the operation circuits 150, 160, 170 an 180, the general register circuit 190, and the address generator circuit 200 are driven, thereby calculating neuron outputs. The instructions contained in the program are as follows:

$$\left.\begin{array}{l} \text{MADD} \quad Z, x, Ax, Ax\, MRZ\, [R, ZA1 + 1] \\ \quad . \\ \quad . \\ \quad . \\ \text{MADD} \quad Z, x, Ax, Ax\, MRZ\, [R, ZA1 + 1] \end{array}\right\} m \text{ times}$$

MADD is an instruction for obtaining a sum of products. This instruction is:

Z.x+Ax→Ax

Read(ZA1)→Z

ZA1+1→ZA1

The first line of the instruction means that the data Z in the memory 58a be multiplied by the data x on the broadcast bus 55, then the output Ax of the general register circuit 190 be added to the resultant product, and finally the resultant sum be stored as new output Ax into the general register circuit 190.

The second line of the instruction means that the data stored in the first address register (ZA1) of the memory 58a be read out and be latched as data z. The third line of the instruction means that one be added to the data ZA1, so that the data can be read from the next (second) address register (ZA2) of the memory 58a. The steps represented by the second and third lines are executed in parallel.

The data on the memory bus 56 is supplied to the memory-data interface 140 through the terminal 113, and is held in the interface 140. The data on the broadcast bus 55 is supplied via the terminal 110 to the broadcast-bus interface 120 and held therein.

Data Z and data x are read onto the A bus and the B bus, respectively, and are then input to the multiplier circuit 160.

The output of this circuit 160 is input to the first selector 181 of the ALU circuit 180. Data Ax is the signal 191 output by the general register circuit 190, and is input to the second selector 182 of the ALU circuit 180. The output of the ALU circuit 180 is supplied via the buffer 184 and the C bus and written into the general register circuit 190.

As has been described, the address generator circuit 200 comprises the adder portion 201, the increment register 202, the address register 203, the initial-value register 204, the final-value register 205, the selector 206, and the comparator portion 207. The selected one of the addresses stored in the address register 203 is supplied, as signal 209, from the terminal ZD to the memory 58a. The adder portion 201 performs the addition defined by the third line of the sum-of-product instruction MADD. The increment register 202 stores an increment value of one. The instruction MADD is executed by pipeline operation, and sums of products can be obtained continuously.

After the neuron operation circuits 51a to 51d have calculated $I^2_i$, the interim outputs of all second-layer neurons, the function transform of equation (2) is carried out. Equation (2) can be changed into the following linear equation:

MUL Ax, Bx, Cx

ADD Cx, Dx, Ax

These notations can be transformed into the following ones:

Ax.Bx→Cx($I^2$ia→Cx)

Cx+Dx→Ax(Cx+b→$x^2$i)

Assuming that Ax=$I^2$i, Bx=a, and Dx=b, we can obtain:

$x^2 i = a.I^2 i + b$

No explanation may be required to understood that the instruction defined by the first notation is executed by the multiplier circuit 160 and the general register circuit 190, and the instruction defined by the second notation is executed by the ALU circuit 180 and the general register circuit 190. The flag set by the results of the operation performed by the ALU circuit 180 is held by the flag register 211 which is provided in the control circuit 210. If the instruction is more complicated, Taylor development is applied to accomplish the function transform. Then, the function transform can be expressed by addition-multiplication combinations, and the program will be basically the same as linear equations.

To achieve the function transform, the equation of this transform can be altered, depending on the amount of data subjected to the function transform. In the case where a stored program computer of ordinary type is employed to accomplish the function transform, it is determined whether or not the transform is executed in accordance with a conditioned jump instruction after data-comparison has been completed. This method is not applied to the the present invention since the neuron operation circuits 51a to 51d have no program counters. The ordinary program is as follows:

CMP Ax, Bx

CJMP GT, AAA

MUL Ax, Bx, Cx

ADD Cx, Dx, Ax where AAA is the next instruction. The first line of the program means that Ax be compared with Bx. The second line thereof means that the operation jump to address AAA if Ax is greater (GT) than Bx, i.e., Ax> BX. If AX=BX or Ax<Bx, the last two instructions MUL and ADD are executed.

The neuron operation circuits 51a to 51d have a jump flag each, which is held in the control circuit 210. When the jump flag is set, the neuron operation circuit performs no operation until it receives a reset J instruction. The above program can be rewritten into the following:

CMP Ax, Bx

SET J GT

MUL Ax, Bx, Cx

ADD Cx, Dx, Ax

RESET

NEXT INSTRUCTION

The second line means that the jump flag 215 be set if the flat GT is set, and the following two steps, MUL and ADD be not executed. The fifth line means that the jump flag 215 be reset, so that the next instruction can be executed in the next step.

As can be understood from the above, the input value to undergo function transform is divided into quasi-linear clusters, and the neuron operation circuits simultaneously operate, processing these quasi-linear clusters, in accordance with one and the same instruction.

2. Backpropagation

Either neuro-chip shown in FIG. 5 performs back-propagation, as will be explained with reference to FIGS. 11A and 11B. Equation (4) for determining the error of any first-layer neuron of the multilayer perceptron neural network, is as follows, if the first layer is a hidden layer:

$$d1j = \left( \sum_{i=1}^{n} W_{ij} \cdot d^2 i \right) \cdot f(x^1 j) \qquad (4)$$

$$= D^1 j \cdot f(x^1 j)$$

It takes more time to calculate $D^1 j$ than to calculate any other terms of equation (4)'. FIG. 11A illustrates the intermediate result $D^1 j$. This weight matrix is one transposed from the weight matrix shown in FIG. 10A. Hence, although the weight $W_{11}$ is stored in the memory 58a coupled to the neuron operation circuit 51a which calculates $D^1_1$, the other weights $W_{21}$ to $W_{n1}$ are stored in the other memory (58b ---) connected to the other neuron operation circuit (51b ---). The same holds true of the errors of the other first-layer neurons, i.e., $d^1_2, d^1_3, \ldots, d^1_n$.

Figures 11A, 11B:
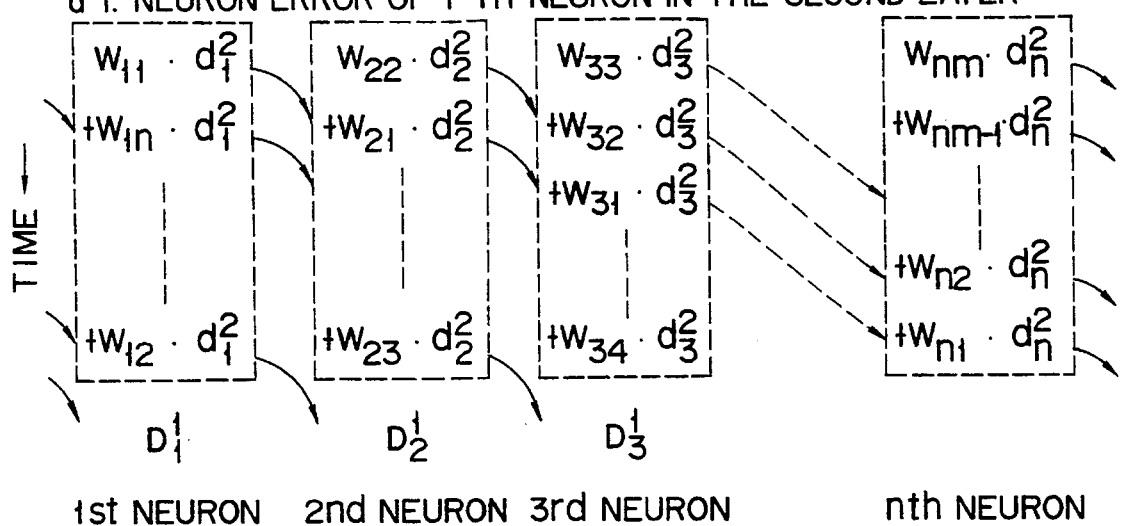
FIGS. 11A and 11B are diagrams explaining the backpropagation each neuro-chip (FIG. 5) performs.

Hence, the weights $W_{11}$ to $W_{1m}$ are input to the first neuron, and the weights $W_{21}$ to $W_{2m}$ for the second neuron, as is illustrated in FIG. 11A. Then, as is shown in FIG. 11B, the first neuron calculates $W_{11} d^2_1$ and supplies this result to the second neuron; the second neuron calculates $W_{21} d^2_2$, adds this result to $W_{11} d^2_1$, and supplied the resultant sum to the third neuron. The other neurons perform similar multiplication and addition. And the last neuron obtains the value of $W_{n1} d^2_n$ and add this to the result. This value is applied to the first neuron, whereby $D^1_1$ is calculated.

Similarly, $D^1_2$ is calculated by determining $W_{22} d^2_2$ in the second neuron, adding this product to $W_{32} d^2_3$ determined in the third neuron, and similar multiplication and addition are repeated in the other neurons until the second neuron obtains $D^1_2$ at the same time the first neuron obtains $D^1_1$.

Data is transferred among the n neurons at the same time, through the ring bus 56 which connects the neuron operation circuits 51a to 51d.

For example, the neuron operation circuit 51 receives the results of the operation performed by the next neuron operation circuit, at the terminal 111 from the ring bus 56, and outputs the results of the operation it has performed, from the terminal 112 through the ring bus 56. The data on the ring bus 56 is held by the latch circuit 131 incorporated in the ring-bus interface 130. The neuron operation circuits 51a to 51d carry out multiplication and addition in the same manner as is shown in FIGS. 11A and 11B, as do the neurons.

The operations explained with reference to FIGS. 11A and 11B can be performed in accordance with the following program:

$$\left.\begin{array}{l} \text{MADD}\quad Z, Bx, YI, YO, MRZ\,[R, ZA1,-1] \\ \quad \cdot \\ \quad \cdot \\ \quad \cdot \\ \text{MADD}\quad Z, Bx, YI, YO, MRZ\,[R, ZA1,-1] \end{array}\right\} n \text{ times}$$

Each instruction of this program means:

Z.Bx+YI→YO

Read (ZA1)→Z

ZA1−1→ZA1

More specifically, the first line means that $d^2_i$ at Bx be multiplied by the weight read to Z, the product be added to the input YI on the ring bus 56, and the sum be output from the terminal YO to the ring bus 56. The second line means that the data stored in the first address register (ZA1) of the memory 58 be read out and to be latched as data Z. The third line means that the data stored in the address register (ZA1) is reduced by one, so that the data can be read from the next (second) address register (ZA2) of the memory 58. The steps of the second and third lines are carried out in parallel.

The data on the ring bus 56 is supplied via the terminal 111 and held in the ring-bus interface 130. It is read from the interface 130 to the A bus or the B bus. The data is subjected to operation, and the results of the operation are output to the C bus, held in the ring-bus interface 130, and output from the terminal 112. The operations of the other components shown in FIG. 7 have been described, and will not be explained here again.

The program described above have been prepared on the following premises:

(1) The terminal 111 is at "0" level at the start of operation.

(2) The address output by the address generator 200 ausumes a maximum value after taking a minimum value. More precisely, the address generator 200 output $W_{1n}$ after $W_{11}$.

(3) The initial address stored in the address register ZA1 of each neuron operation circuit it the very address specified in FIG. 11B.

Hitherto explained is how to calculate $D^1_i$ by means of backprogagation. It suffices to multiply $D^1_i$ by $f'(x^1_i)$, thereby to achieve the function transform. Equation (3) can easily be solved by performing multiplications and adding the resultant products Equation (5) is different from equation (4) in two respects. First, the teaching signal yi is broadcast from the processor 81. Second, the value of $(yu-x^2_i)$ is calculated by each neuron operation circuit.

3. Determining of Weights

A method is known which determined the weights of the neurons forming a neural network, by means of self-organizing of the neural network. In this method, upon receipt of an input, each neuron determined how much its weight is similar to the input. To determine the similarity, it is necessary to find the distance Si of the vector between the weight and the output of the neuron. Enormous time is required to find the distance Si, as may be understood from the following equation:

$$Si = \sum_{j=1}^{m} |W_{ij} - x^1_i|^2/n \qquad (6)$$

where n is a constant which prevents Si from over-flowing, and ensures acquisition of many significant figures. Equation (6) can be solved by repeating, m times, the following program instructions:

ABSSQSHADD Z, X, AX, AX, MRZ [R, ZA1, +1]

| | |
|---|---|
| $\|Z-X\| \to L154$ | (a) |
| $L154.L154 \to L164$ | (b) |
| $L165 \to$ arithmetic shift $\to L174$ | (c) |
| $L174+AX \to AX$ | (d) |
| Read (Za1) $\to$ Z | (e) |
| Za1+1 $\to$ ZA1 | (f) |

The buses are used in the following manner:

| | |
|---|---|
| Z→A Bus | (g) |
| Z→B Bus | (h) |
| ALU Output→C Bus→AX | (i) |

The weight $W_{ij}$ is supplied onto the B bus from the memory (g), and the neuron output $x^1_j$ is supplied onto the B bus from the broadcast bus 55 (h). Part of the neuron output $x^1j$ (h) is input through a selector circuit to the calculator 152 of the absolute-value calculating circuit 150. The calculator 152 performs the calculation (a), and the results of the calculation are stored into the latch circuit 155 (a). Next, the output of the latch circuit 154 is supplied to the multiplier 163 through the selector circuits 161 and 162. The product of the multiplication the multiplier 163 carries out is stored into the latch circuit 165, as can be understood from the notation (b). Further, the output of the latch circuit 165 is input to the barrel shifter 172 through the selector circuit 171. The barrel shifter 171a performs arithmetic shifting of the input data. In other words, it divides the input data by n, and the resultant quotient is stored into the latch circuit 174, as is understood from the notation (c).

Next, the output of the latch circuit 174 and the B output of the general register 192 are input to the ALU circuit 183 through the selector circuits 181 and 182, respectively, as is evident from the notation (d). The sum, obtained by the ALU circuit 183, is supplied to the C input of the general register 192 through the C bus, and is written into the register AX, as is understood from the notation (i).

The notations (e) and (f), i.e., Read (ZA1)→Z and ZA1+1→ZA1, means just the same as has been described above.

As has been described, latch circuits are used to transfer data among the operation circuits, thereby reducing the number of buses to a minimum. In addition, since the operations are pipeline ones, they are simultaneously performed, equivalently in a single cycle.

The neurocomputer shown in FIG. 5 can constitute, not requiring much hardware, a neural network which has a number of neuro-chips each containing two or more operation circuits. The neuro-chips need not be IC of great hardware, such as dual port memories, since they operate in synchronism with each other and in accordance with same instruction. Further, the neuro-chip need not have one program memory each. Hence, the neuro-chip according to the invention can contains more neuron operation circuits than the conventional neuro-chip which occupies the same area.

Moreover, since the broadcast bus 55 and the ring bus 56 are used efficiently, the neuro-chip of the invention encounters but a small overhead. It can constitute a neural network, wherein the neuron operation circuits perform their function with high efficiency. In other words, it can help to provide high-speed neural networks.

Were the data input to a neural network transferred to the neuro-chips forming the network through a ring bath only, the neuro-chips would encounter great overhead. In the invention, however, the input data is transferred via the broadcast bus 55, simultaneously to the neuro-chips. In addition, the ring bus 56 is efficiently used to distribute data to the neuro-chips, whereby the neuro-chips perform operations simultaneously and independently of each other. Due to the use of two buses (i.e., the broadcast bus 55 and the ring bus 56), the neuron operation circuit can not only calculates neuron outputs at high speed, but also have high learning ability.

Furthermore, since all neuro-chips incorporated in the neurocomputer receive the same program and execute it, they easily operate in synchronism with each other. Different programs need not be prepared. Yet can the neuro-chips perform different operations by setting jump flags.

Further, unlike an analog chip, or a digital circuit in which the neurons are assigned with fixed weights, the neuro-chip of the present invention is controlled by program and, hence, has high learning ability.

Still further, the neuron operation circuits 51a to 51d incorporated in the neuro-chips 71a and 71b function like neurons. For example, when the weights for a plurality of neurons are stored in the memory coupled to each neuron operation circuit, the circuit functions as a plurality of neurons which operate in time-sharing fashion. Therefore, the neuro-chips 71a and 71b form a neural network which is flexible because its neurons operate in time-sharing fashion.

As has been described, memories can be built in each neuro-chip, in which case neither address terminals nor data terminals are required to connect the memories to the neuro-chip, and the neuro-chip can be driven by supplying signals through only three buses, i.e., the broadcast bus 55, the ring bus 56, and the program-data bus 57. The number of these buses does not increase even if the neuro-chip incorporates more neuron operation circuits. Hence, the neuro-chip according to the invention helps to build a neuro-computer which has small-scale hardware and a relatively small number of liens. In addition, the weight memories can be replaced by ones having less storage capacity if the neuro-chip has counters for starting and stopping the neuron operation circuits, and it therefore suffices to store less neuron weights.

The present invention is not limited to the embodiments described above. The operation circuits can be those represented by floating-point numbers. If this is the case, the neuro-chip can acquire many significant figures, but inevitably has large-scale circuitry. Further, the input and output terminals can be switched in the ring-bus interface 130, in which case the data can be transferred through the ring bus 56, either clockwise or counterclockwise (FIG. 5). This modification can, in some cases, decrease the time required for calculating neuron outputs.

When only some of the neuron operation circuits need to be used, the ring bus 56 can be shortened. To this end, that part of the bus 56 connecting the unnecessary neuron operation circuits is removed, and two data paths are provided in each necessary circuit, one connecting the terminals X and YI and the other connecting the terminals X and YO. Also in this case, the neuron outputs can be calculated within a shorter time. In this case, the data is output from the terminal X onto the broadcast bus 55, not onto the ring bus 56; and the input data is received from the terminal x, not from the ring bus 56. In other words, the broadcast bus 55 is used as a bypass.

As can be understood from the foregoing, the present invention can provide a neuro-chip of simple structure, which has a plurality of neurons. Also, this invention can provide a neuro-chip which can be connected to other neuro-chips. Further, the present invention can provide a neuro-chip which can process data at high speed. In addition, since the neuron operation circuits incorporated in the neuro-chip can be driven in accordance with the same program, it is unnecessary to prepare different programs. Moreover, no long lines are required to connect the components of the neuro-chip, the neuro-chip can easily be made to have high integration density.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A neuro-chip which comprises:

a plurality of neuron operation circuit means, each of said neuron operation circuit means for simulating neurons, for learning, and for functioning as a neuron arranged in a plurality of layers, at least two said plurality of neuron operation circuit means being connecting neuron operation circuit means for connection with other neuron operation circuit means which are not a part of said neuro-chip;

a broadcast bus connected to each of said neuron operation circuit means which broadcasts data between each of said neuron operation circuit means;

a program data bus connected to each of said neuron operation circuit means which supplies a common program externally input to each of said neuron operation circuit means; and a pair of ring bus terminals connected to said connecting neuron operation circuit means, for transferring data among said connecting neuron operation circuit means of said neuro-chip and said other neuron operation circuit means which are not a part of said neuro-chip through a ring bus.

2. The neuro-chip according to claim 1, wherein each of said neuron operation circuit means includes a control circuit having a flag means which renders the common program not executable, in accordance with a status signal.

3. The neuro-chip according to claim 1, wherein each of said neuron operation circuit means includes a plurality of counter means for counting a number of repetitions of the common program with an instruction and a control circuit means for starting and stopping the execution of the instruction.

4. A neuro-chip which comprises:
a plurality of neuron operation circuit means, each of said neuron operation circuit means for simulating neurons, for learning, and for functioning as a neuron arranged in a plurality of layers, at least two of said plurality of neuron operation circuit means being connecting neuron operation circuit means for connection with other neuron operation circuit means which are not a part of said neuro-chip;
a broadcast bus connected to each of said neuron operation circuit means which broadcasts data between each of said neuron operation circuit means;
a program data bus connected to each of said neuron operation circuit means which supplies a common program externally input to each of said neuron operation circuit means; and
a pair of ring bus terminals connected to said connecting neuron operation circuit means, for transferring data among said connecting neuron operation circuit means of said neuro-chip and said other neuron operation circuit means which are not a part of said neuro-chip through a ring bus,
wherein each of said neuron operation circuit means includes:
program hold/interpret means for holding and interpreting the common program;
operation means for executing an instruction output by said program hold/interpret means;
a broadcast bus interface connected to said broadcast bus;
a ring bus interface connected to said ring bus;
a memory for storing data representing a weight assigned to said neuron operation circuit means and holding data output by said operation means; and
a memory interface connected to said memory.

5. The neuro-chip according to claim 4, wherein each of said neuron operation circuit means further includes a control circuit having a flag means which renders the common program not executable, in accordance with a status signal.

6. The neuro-chip according to claim 4, wherein each of said neuron operation circuit means further includes a plurality of counter means for counting a number of repetitions of the common program with an instruction and a control circuit means for starting and stopping the execution of the instruction.

7. A neuro-chip which comprises:
a plurality of neuron operation circuit means, each of said neuron operation circuit means for simulating neurons, for learning, and for functioning as a neuron arranged in a plurality of layers, at least two of said plurality of neuron operation circuit means being connecting neuron operation circuit means for connection with other neuron operation circuit means which are not a part of said neuro-chip;
a broadcast bus connected to each of said neuron operation circuit means which broadcasts data between each of said neuron operation circuit means;
a program data bus connected to each of said neuron operation circuit means which supplies a common program externally input to each of said neuron operation circuit means;
a pair of ring bus terminals connected to said connecting neuron operation circuit means, for transferring data among said connecting neuron operation circuit means of said neuro-chip and said other neuron operation circuit means which are not a part of said neuro-chip through a ring bus, and
a memory for storing data representing a weight assigned to each of said neuron operation circuit means and holding data output by said neuron operation circuit means,
wherein each of said neuron operation circuit means includes:
program hold/interpret means for holding and interpreting the common program;
a broadcast bus interface connected to said broadcast bus;
a ring bus interface connected to said ring bus;
a memory interface connected to said memory; and
operation means for executing an instruction output by said program hold/interpret means.

8. The neuro-chip according to claim 7, wherein each of said neuron operation circuit means further includes a control circuit having a flag means which renders the common program not executable in accordance with a status signal.

9. The neuro-chip according to claim 7, wherein each of said neuron operation circuit means further includes a plurality of counter means for counting a number of repetitions of the common program with an instruction and a control circuit means for starting and stopping the execution of the instruction.

10. A neurocomputer which comprises:
a processor for controlling components of the neurocomputer;
a memory provided for said processor;
a program memory provided for said processor;
a plurality of neuron operation circuit means, each of said neuron operation circuit means for simulating neurons, for learning, and for functioning as a neuron arranged in a plurality of layers, at least two of said plurality of neuron operation circuit means being connecting neuron operation circuit means for connection with other neuron operation circuit means which are not a part of said neuro-chip;
a program memory provided in common for said neuron operation circuit means;
a plurality of memories provided for said neuron operation circuit means, respectively;
a broadcast bus connecting said processor to said neuron operation circuit means, for transferring data between said processor and said neuron operation circuit means;
a ring bus connecting said neuron operation circuit means, for transferring data among said neuron operation circuit means; and
a program data bus for supplying a program from said program memory to each of said neuron operation circuit means.

11. A neuro-chip which comprises:
a first neuron operation circuit means for simulating neurons, for learning, and for functioning as a neuron arranged in a plurality of layers;
a broadcast bus terminal for broadcasting a first data from said first neuro operation circuit means through a broadcast bus to a connecting neuron operation circuit means of another neuro-chip, said connecting neuron operation circuit means for simulating neurons, for learning, and for functioning as a neuron arranged in a plurality of layers;
a program data bus terminal for supplying a common program externally input to said first neuron operation circuit means; and
a ring bus terminal, connected to said first neuron operation circuit means, for transferring a second data between said first neuron operating circuit means and said connecting neuron operation circuit means using a ring bus.

12. The neuro-chip according to claim 11, wherein each of said neuron operation circuit means of said neuro-chip includes a control circuit having a flag means which renders the common program not executable, in accordance with a status signal.

13. The neuro-chip according to claim 11, wherein each of said neuron operation circuit means includes a plurality of counter means for counting a number of repetitions of the common program with an instruction and a control circuit means for starting and stopping the execution of the instruction.

14. The neuro-chip according to claim 11, wherein said first neuron operation circuit means includes:

program hold/interpret means for holding and interpreting the common program;

operation means for executing an instruction output by said program hold/interpret means;

a broadcast bus interface connected to said broadcast bus;

a ring bus interface connected to said ring bus;

a memory for storing data representing a weight assigned to said neuron operation circuit means and holding data output by said operation means; and a memory interface connected to said memory.

* * * * *

UNITED STATES PATENT AND TRADEMARK OFFICE
CERTIFICATE OF CORRECTION

PATENT NO.  : 5,517,600
DATED       : May 14, 1996
INVENTOR(S) : Yoshiyuki SHIMOKAWA It is certified that error appears in the above-indentified patent and that said Letters Patent is hereby corrected as shown below:

On the title page, Item [54], the title, should read:

--DIGITAL NEURO-CHIP AND NEUROCOMPUTER CAPABLE OF BUILDING ARTIFICIAL NEURAL NETWORKS--

Also, Item [63], the Related U.S. Application Data, should read:

--Continuation of Ser. No. 663,169, Mar. 1, 1991, abandoned--

Signed and Sealed this

Thirteenth Day of August, 1996

Attest:

BRUCE LEHMAN

*Attesting Officer*    *Commissioner of Patents and Trademarks*